United States Patent
Bystrov et al.

(10) Patent No.: US 10,672,122 B2
(45) Date of Patent: Jun. 2, 2020

(54) OPTIMIZING USER INTERACTIONS IN SEGMENTATION

(71) Applicant: KONINKLIJKE PHILIPS N.V., Eindhoven (NL)

(72) Inventors: Daniel Bystrov, Hamburg (DE); Dominik Benjamin Kutra, Karlsruhe (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 116 days.

(21) Appl. No.: 15/774,623

(22) PCT Filed: Nov. 1, 2016

(86) PCT No.: PCT/EP2016/076282
§ 371 (c)(1),
(2) Date: May 9, 2018

(87) PCT Pub. No.: WO2017/084871
PCT Pub. Date: May 26, 2017

(65) Prior Publication Data
US 2018/0330505 A1 Nov. 15, 2018

(30) Foreign Application Priority Data

Nov. 19, 2015 (EP) .................................... 15195285

(51) Int. Cl.
*G06T 7/00* (2017.01)
*G06T 7/10* (2017.01)

(52) U.S. Cl.
CPC .............. *G06T 7/0012* (2013.01); *G06T 7/10* (2017.01); *G06T 2200/24* (2013.01);
(Continued)

(58) Field of Classification Search
CPC .................. G06T 7/10; G06T 2200/24; G06T 2207/10081; G06T 2207/10116;
(Continued)

(56) References Cited

U.S. PATENT DOCUMENTS 9,710,915 B2 * 7/2017 Firouzian ................ G06F 16/50
2012/0095953 A1 * 4/2012 Schmidt ............. G06K 9/00335
706/52

(Continued)

OTHER PUBLICATIONS

Chen, et al., "Usability Practice in Medical Imaging Application Development", Nov. 9, 2009, HCI and Usability for E-Inclusion, Springer Berlin, Heidelberg, Berlin, pp. 405-415.
(Continued)

*Primary Examiner* — Ping Y Hsieh

(57) ABSTRACT

A system and a computer-implemented method are provided for segmenting an object in a medical image using a graphical segmentation interface. The graphical segmentation interface may comprise a set of segmentation tools for enabling a user to obtain a first segmentation of the object in the image. This first segmentation may be represented by segmentation data. Interaction data may be obtained which is indicative of a set of user interactions of the user with the graphical segmentation interface by which the first segmentation of the object was obtained. The system may comprise a processor configured for analyzing the segmentation data and the interaction data to determine an optimized set of user interactions which, when carried out by the user, obtains a second segmentation similar to the first segmentation, yet in a quicker and more convenient manner. A video may be generated for training the user by indicating the optimized set of user interactions to the user.

13 Claims, 10 Drawing Sheets

(52) U.S. Cl.
CPC ............... *G06T 2207/10072* (2013.01); *G06T 2207/10116* (2013.01); *G06T 2207/20092* (2013.01); *G06T 2207/20096* (2013.01); *G06T 2207/20101* (2013.01); *G06T 2207/20104* (2013.01); *G06T 2207/20108* (2013.01); *G06T 2207/30004* (2013.01)

(58) Field of Classification Search
CPC . G06T 2207/20104; G06T 2207/10072; G06T 2207/20092; G06T 2207/20096; G06T 2207/20101; G06T 2207/20108; G06T 2207/30004; G06F 3/04847; G06F 3/0485
See application file for complete search history.

(56) References Cited

U.S. PATENT DOCUMENTS

| | | | | |
|---|---|---|---|---|
| 2016/0292848 | A1* | 10/2016 | Plakas | A61B 8/085 |
| 2017/0301085 | A1* | 10/2017 | Raviv | G06F 19/321 |
| 2018/0268549 | A1* | 9/2018 | Bystrov | G06T 7/11 |
| 2018/0276815 | A1* | 9/2018 | Xu | G06T 7/0012 |
| 2019/0340765 | A1* | 11/2019 | Scott | G06T 7/11 |

OTHER PUBLICATIONS

Anonymous: "3D-Doctor, medical modeling, 3D medical imaging, Tutorial", Oct. 8, 2015; retrieved from the Internet: URL:https://web.archive.org/web/20151008022928/http://www.ablesw.com/3d-doctor/tutor.html [retrieved on Apr. 28, 2016] pp. 1-12.

* cited by examiner

OPTIMIZING USER INTERACTIONS IN SEGMENTATION

This application is the U.S. National Phase application under 35 U.S.C. § 371 of International Application No. PCT/EP2016/076282, filed on Nov. 1, 2016, which claims the benefit of European Application Serial No. 15195285.0, filed Nov. 19, 2015. These applications are hereby incorporated by reference herein.

FIELD OF THE INVENTION

The invention relates to a system and a computer-implemented method for segmentation of an object in an image. The invention further relates to a workstation and imaging apparatus comprising the system, and to a computer program product comprising instructions for causing a processor system to perform the method.

BACKGROUND OF THE INVENTION

Segmentation of objects in images, e.g., medical images, is important in various scenarios and, in general, may enable desirable quantitative measurements. In radio therapy planning, for example, segmentations, also referred to as delineation or annotation, of organs may enable calculation of the dose for target sites and organs at risk. Another example may be tumour segmentation for the assessment of neo-adjuvant chemotherapy. In many applications, automatic algorithms may be used to segment organs. Very often, however, manual and/or semi-automatic interaction may be required to correct the automatically generated result or manual segmentation may preferred over automatic segmentation for other reasons. Several different graphical segmentation interfaces comprising various segmentation tools with varying parameters are available.

It may be desirable to enable the user to efficiently obtain such manual or semi-automatic segmentations using a graphical segmentation interface.

US 2015/0155010 A1 describes a method for retrieving information about a medical image presented at a user interface of a processing unit of a medical imaging system. The method includes: display of a reference to at least one video stored on the processing unit and integrated into the user interface; activation of the reference and selection of the video by a user and playing of the video. The video contains demand-specific and context-related information and/or operating instructions for the user. A processing unit of a medical imaging system is also disclosed. In an embodiment, the processing unit includes a memory unit and program code stored in the memory unit. The program code is embodied such that a medical image of the patient is output at the user interface of the processing unit.

Effectively, US 2015/0155010 A1 aims at making a user efficient at segmentation by showing the user a video-based instruction on how to operate the user interface. A problem of the method of US 2015/0155010 A1 is that the user is still insufficiently efficient when using the described method.

SUMMARY OF THE INVENTION

It would be advantageous to have a system or computer-implemented method for enabling a user to more efficiently obtain a manual or semi-automatic segmentation of an object in an image.

To better address this concern, a first aspect of the invention provides a system for segmenting an object in an image, comprising:
a user interface subsystem comprising:
i) a display output for establishing a graphical segmentation interface on a display, the graphical segmentation interface comprising a set of segmentation tools for enabling the user to obtain a first segmentation of the object in the image, wherein the first segmentation is represented by segmentation data;
ii) a user input interface configured to receive interaction data from a user device operable by the user, the interaction data being indicative of a set of user interactions of the user with the graphical segmentation interface by which the first segmentation of the object was obtained;
a memory comprising instruction data representing a set of instructions;
a processor configured to communicate with the user input interface and the memory and to execute the set of instructions, wherein the set of instructions, when executed by the processor, cause the processor to:
i) analyze the segmentation data and the interaction data to determine an optimized set of user interactions which, when carried out by the user using the graphical segmentation interface, obtains a second segmentation which is similar to the first segmentation, wherein the optimized set of user interactions is determined by:
j) generate a plurality of candidate sets of user interactions which obtain segmentations similar to the first segmentation,
jj) estimate a time needed for a user to carry out a respective one of the plurality of candidate sets of user interactions using the graphical segmentation interface based on a time metric, the time metric being a function of at least the number of user interactions in a respective candidate set, and
jjj) select one of the plurality of candidate sets of user interactions as the optimized set of user interactions based on said estimate of the time being lowest; and
ii) generate optimized interaction data representing the optimized set of user interactions for enabling indicating the optimized set of user interactions to the user.

The above measures involve enabling a user to segment an object in a medical image using a graphical segmentation interface. For that purpose, a user interface subsystem is provided which comprises a user input interface for receiving interaction data from a user device operable by the user. Moreover, a display output is provided for establishing the graphical segmentation interface on a display. The graphical segmentation interface comprises a set of segmentation tools which may be used for segmentation. By using the segmentation tools, the user may obtain a first segmentation of an object in an image. The object may be, e.g., an anatomical structure in a medical image. The image, formed by image data, may be, e.g., a 2D surface image, a 2D projection image, a 3D volumetric image, or may be constituted by a stack of image slices, and may be acquired by various imaging modalities such as computed tomography (CT) and Magnetic Resonance Imaging (MRI).

A user may, by way of selecting the appropriate segmentation tools of the graphical segmentation interface, apply one or more segmentation methods to the image for obtaining the first segmentation. Examples of known segmentation methods include thresholding, clustering, region-growing or model-based segmentation. User interactions with the segmentation tools to obtain the first segmentation may be recorded so as to obtain the interaction data. Examples of user interactions include selection actions of the user, switching between different segmentation tools, zooming action, panning action, etc. The interaction data may, as such, be indicative of a set of user interactions of the user with the graphical segmentation interface by which the segmentation of the object was obtained. For example, interaction data may indicate selecting the segmentation tools, their parameters and their order. The order of the tools may refer to the sequence of the usage of the tools. A parameter of a tool may be a characteristic, feature, or measurable factor defining a segmentation tool. For example, for a pencil tool, a stroke width may be considered as the tool parameter.

The above measures further involve a processor configured by way of instruction data representing instructions to analyze the segmentation data and the interaction data to determine an optimized set of user interactions which, when carried out by the user using the graphical segmentation interface, obtains a second segmentation which is similar to the first segmentation. The second segmentation may be considered similar to the first segmentation when at least a similarity criteria such as a volume, surface or shape of the second segmentation yield a value sufficiently close to that of the first segmentation. For example, in a 3D segmentation of a 3D object, when the volume of the second segmentation yields, e.g., above 90%, 95% or 99% of that of the first segmentation, the segmentations may be considered similar.

The above measures further involve generating a plurality of candidate sets of user interactions which obtain segmentations similar to the first segmentation. The candidate sets of user interactions may be generated based on changing a parameter related to an interaction and/or based on changing order of interaction. The candidate sets may be generated using known optimization methods wherein the similarity criteria may be considered as cost function and, e.g., order of interactions, selecting of segmentation tools, parameters of the segmentation tools, etc, may be considered as optimization parameter.

The above measures further involve estimating a time needed for a user to carry out a respective one of the plurality of candidate sets and selecting one of the plurality of candidate sets of user interactions as the optimized set of user interactions, the optimized set of user providing the user with obtaining the second segmentation faster compared to the other candidate sets of user interactions. Having established a time metric, the optimized set of user interactions may be selected using known optimization methods wherein the time for user interactions to obtain the second segmentation may be considered as cost function.

It is noted that a complexity of a segmentation may also be considered as a cost function of the optimization regardless of a segmentation time. For example, although the second segmentation may be obtained with the same or even more time, the user may be enabled to obtain the second segmentation with less complex tasks and interaction. For example, regardless of time needed for obtaining the second segmentation, the claimed system may enable a user to, e.g., obtain the second segmentation with less number of switches between different image views or segmentation tools and only change a parameter of a segmentation tool, which may be less complex for the user. As such, the above measure may involve estimating a complexity needed for a user to carry out a respective one of the plurality of candidate sets of user interactions using the graphical segmentation interface based on a complexity metric. The above measure may then involve selecting one of the plurality of candidate sets of user interactions as the optimized set of user interactions based on said estimate of the complexity being minimum. It is noted that a time metric may inherently also represent a complexity of the user's interactions since more complex user interactions, for example those needed for a complex segmentation, may naturally take more time. As such, the system and method as claimed may implicitly account for the complexity of the user's interactions based on the time metric.

The above measures further involve generating optimized interaction data representing the optimized set of user interactions for enabling indicating the optimized set of user interactions to the user via the display. For example, the optimized interaction data may indicate segmentation tools being used, a parameter of the segmentation tools and/or the order of the usage of the segmentation tools, etc.

The present invention is based on an insight that the claimed system and method enable a user to become more efficient in obtaining a desired first segmentation by determining an optimized set of user interactions which may be indicated to the user to obtain a second segmentation similar to the first segmentation in less time. The optimized set of user interactions may be determined by analyzing segmentation data which represents user interactions already performed by the user to obtain the first segmentation. Since the optimized set of user interactions is determined based on obtaining a second segmentation similar to the first segmentation that the user has already generated by using certain segmentation tools, the optimized set of user interactions may be directly relevant to what the user aims for. As such, the system and the method as claimed will enable the user to be efficient in obtaining a desired segmentation faster.

The optimized set of interactions may be presented to the user via the display, who thereby may be advantageously informed of, for example, optimal parameters of a segmentation tool or available tools that the user did not use for the generation of the first segmentation. Furthermore, the user may be guided to use a plurality of segmentation tools in a particular sequence. It is noted that, in addition to informing the user of the optimized set of interactions, default parameters of the segmentation tools of the graphical segmentation interface may be also optimized based on the optimized interaction data.

Optionally, the set of user interactions comprises a user interaction representing the user applying a segmentation tool, and the set of instructions, when executed by the processor, cause the processor to change a parameter of the segmentation tool so as to generate different candidate sets of user interactions. A user may thus be enabled to obtain a desired segmentation only by the claimed system and method determining a more optimal parameter of a segmentation tool without a need to use different tools. Advantageously, this may enable the user to be more efficient in obtaining the desired segmentation.

Optionally, the set of user interactions is comprised of a sequence of user interactions, and the set of instructions, when executed by the processor, cause the processor to change the sequence of user interactions so as to generate different candidate sets of user interactions. A user may thus be enabled to obtain a desired segmentation only by the claimed system and method determining a more optimal sequence of user interactions without a need to use different tools or different parameters. Advantageously, this may enable the user to be more efficient in obtaining the desired segmentation.

Optionally, the graphical segmentation interface comprises at least one unused segmentation tool not used by the user to obtain the first segmentation, and wherein the plurality of candidate sets of user interactions is generated using the at least one unused segmentation tool. A user may be advantageously enabled to obtain a desired segmentation more efficiently by using a segmentation tool that the user did not use to obtain the first segmentation, because, for example, the user did not know the tool existed or because the user was not aware of the tool function or its optimized parameter.

Optionally, the time metric comprises at least one parameter which is indicative of an action selected from the list of: selection actions of the user, switching between different segmentation tools, switching between different image slices, zooming action and panning action. Including main user actions such as those mentioned in the list, the time needed for a user to carry out a respective one of the plurality of candidate sets of user interactions using the graphical segmentation interface based may be more accurately estimated. A more accurate estimation of the time may enable a more accurate selection of the optimized set of user interactions and thus may advantageously enhance the efficiency of the user to obtain the desired segmentation.

Optionally, the time metric is a function of a type of user interactions in a respective candidate set. Accounting for the type of the user interactions in addition to the number of the user interaction may provide a more optimal set of user interactions because, for example, some of the user interaction, e.g. zooming, may be easier for the user to perform compare to other types of user interactions, e.g., switching between different image slices. As such by weighting the type of a user interaction, the optimized set of user interactions may be selected more optimally.

Optionally, the analyzing subsystem calculates a geometrical complexity of the object and the time metric is a function of the geometrical complexity of the object. Accounting for the geometrical complexity of the object may enable a more optimal selection of the optimized set of user interaction because, for example, if the object has a complex geometry, it may be more optimal to obtain the second segmentation by, e.g., refining a parameter of a segmentation tool, as compared to, e.g., only changing a sequence of user interactions. As such, the geometrical complexity of the object may be translated as the time consumption required for obtaining the segmentation of the object. For example, to accurately segment a circle-like structure with a well-defined boarder, e.g., a cyst in a 2D mammography, a parameter setting may be sufficient to obtain a desired segmentation. However, to segment a speculated mass in the 2D mammography, areas may exist which may be segmented by using a paint tool with a brush with a large diameter, while others areas may need to be segmented using a very small brush and thus may consume more time.

Optionally, the time metric is a function of an image feature of the image. Accounting for the image features, e.g., edges, image intensity, image texture, etc, in addition to the shape characteristics of the object may enable a more optimal selection of the optimized set of user interaction. For example, if the position of the region of interest is, e.g., distributed over multiple image slices, changing a sequence of user interactions may affect the time needed by the user more than, e.g., changing a parameter of a segmentation tool.

Optionally, the set of instructions, when executed by the processor, cause the processor to indicate the optimized set of user interactions to the user by generating a video visually indicating the optimized set of user interactions. By indicating the optimized set of user interactions visually using a video, the user may be advantageously guided more effectively than known methods, e.g. US 2015/0155010 A1, and in a more user friendly and more comprehensive manner. It is noted that, optionally, the video may be generated such that the user is presented by the optimized set of user interactions being applied to the original image that the user used to obtain the first segmentation.

In a further aspect of the invention, a computer-implemented method is provided for segmenting an object in an image, comprising:
  establishing a graphical segmentation interface on a display, the graphical segmentation interface comprising a set of segmentation tools for enabling the user to obtain a first segmentation of the object in the image, wherein the first segmentation is represented by segmentation data;
  receiving interaction data from a user device operable by the user, the interaction data being indicative of a set of user interactions of the user with the graphical segmentation interface by which the first segmentation of the object was obtained;
  analyzing the segmentation data and the interaction data to determine an optimized set of user interactions which, when carried out by the user using the graphical segmentation interface, obtains a second segmentation which is similar to the first segmentation, wherein the optimized set of user interactions is determined by:
    i) generating a plurality of candidate sets of user interactions which obtain segmentations similar to the first segmentation,
    ii) estimating a time needed for a user to carry out a respective one of the plurality of candidate sets of user interactions using the graphical segmentation interface based on a time metric, the time metric being a function of at least the number of user interactions in a respective candidate set, and
    iii) selecting one of the plurality of candidate sets of user interactions as the optimized set of user interactions based on said estimate of the time being lowest; and
  generating optimized interaction data representing the optimized set of user interactions for enabling indicating the optimized set of user interactions to the user.

A further aspect of the invention provides a workstation and an imaging apparatus comprising the system described above.

In a further aspect of the invention, a computer program product is provided comprising instructions for causing a processor system to perform the method.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 2b shows the zoomed-in view of FIG. 2a;

FIG. 9b shows a result of Adaptive Contour Propagation applied to the image slice of FIG. 9a;

DETAILED DESCRIPTION OF EMBODIMENTS

Figure 1:
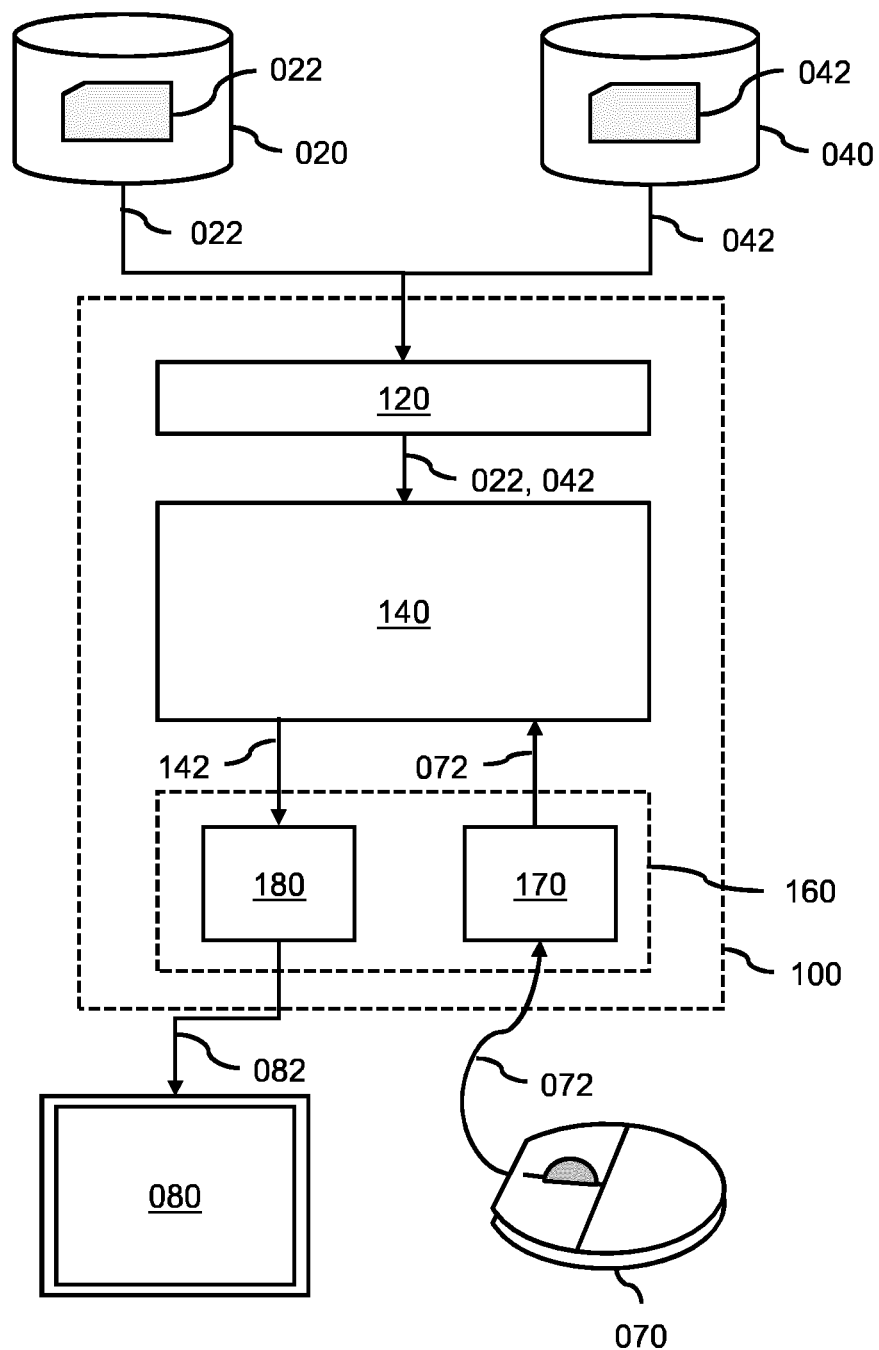
FIG. 1 shows a system for analyzing segmentation data for enabling indicating an optimized set of user interactions to a user.

FIG. 1 shows a system 100 for analyzing segmentation data for enabling indicating an optimized set of user interactions to a user. The system 100 may comprise an input interface 120 for accessing image data of an image. In the example of FIG. 1, the input interface 120 is shown to be connected to an external image repository 020 which comprises the image data of the image. For example, the image repository 020 may be constituted by, or be part of, a Picture Archiving and Communication System (PACS) of a Hospital Information System (HIS) to which the system 100 may be connected or comprised in. Accordingly, the system 100 may obtain access to the image data of the image via the HIS. Alternatively, the image data may be accessed from an internal data storage of the system 100. In general, the input interface 120 may take various forms, such as a network interface to a local or wide area network, e.g., the Internet, a storage interface to an internal or external data storage, etc. It is noted that, interaction data 072 may be obtained from an external database 040; this however does not embody the invention. In the example of FIG. 1, the system 100 is shown to further comprise a user interface subsystem 160 which may be configured for receiving the interaction data 072 from a user device 070 operable by the user. It is noted that the user device 070 may take various forms, including but not limited to a computer mouse 070, touch screen, keyboard, etc. The user interface subsystem 160 may establish/ provide the graphical segmentation interface, e.g., on the basis of graphical interface data which may be stored in a memory (not shown) accessible to the user interface subsystem. The user interface subsystem 160 may comprise a user input interface 170 which may be of a type which corresponds to the type of user device 070, i.e., it may be a thereto corresponding user device interface. The user interface subsystem 160 is further shown to comprise a display output 180 for providing display data 082 to a display 080. For example, the display data may comprise optimized interaction data 142 generated by a processor 140 of the system 100 for enabling indicating an optimized set of user interactions to the user.

The processor 140 may be configured, by way of instruction data representing a set of instructions, to analyze the segmentation data and the interaction data 072 to determine an optimized set of user interactions which, when carried out by the user using the graphical segmentation interface, obtains a second segmentation which is similar to the first segmentation. Although not shown explicitly in FIG. 1, the instruction data may be stored in a memory of the system which is accessible to the processor. The processor 140 is further configured for generating the optimized interaction data 142 representing the optimized set of user interactions for enabling indicating the optimized set of user interactions to the user. For that purpose, the processor 140 of the example of FIG. 1 receives the segmentation data and the interaction data 042, and to output optimized interaction data 142. It is noted that the segmentation data is not explicitly shown in FIG. 1, as it may be internal data generated by the processor. Alternatively, the segmentation data may be stored in a or the memory.

The processor 140 may be configured for generating a plurality of candidate sets of user interactions which obtain segmentations similar to the first segmentation. The processor 140 may be further configured for selecting one of the plurality of candidate sets of user interactions as the optimized set of user interactions based on said estimate of the time being lowest. The inventors have recognized that the user may be efficient in obtaining a desired first segmentation by using the optimized set of user interactions. Since the optimized set of user interactions may be determined based on obtaining a second segmentation similar to the first segmentation that the user has already generated by using certain segmentation tools, the optimized set of user interactions may be directly relevant to what the user aims for.

The processor 140 may be configured for changing a parameter of the segmentation tool so as to generate different candidate sets of user interactions. The candidate sets of user interactions may be generated based on changing a parameter related to an interaction or based on changing order of interactions. The candidate sets may be generated using known optimization methods wherein the similarity criteria may be considered as cost function and, e.g., order of interactions, parameters of the segmentation tools, etc, may be considered as optimization parameter.

The processor 140 may be further configured for changing a sequence of user interactions so as to generate different candidate sets of user interactions. For example, when working with multiple image slices, a sequence of switching between different image slices may be optimized so as to obtain the second segmentation faster.

It is noted that the processor 140 may be further configured for generating the plurality of candidate sets of user interactions using at least one unused segmentation tool not used by the user for obtaining the first segmentation. For example, a user may be unaware of a relevant segmentation tool that exist in the graphical segmentation interface. The processor 140 may determine the relevance of the unused segmentation tool for obtaining the second segmentation based on, e.g., the geometry of object to be segmented or an image intensity of the image, etc.

The processor 140 may be further configured for estimating a time needed for a user to carry out a respective one of the plurality of candidate sets of user interactions using the graphical segmentation interface based on a time metric, the time metric being a function of at least the number of user interactions in a respective candidate set. The optimized set of user interactions may be selected using known optimization methods wherein the time of user interactions to obtain the second segmentation may be considered as cost function and, e.g., a number of required user interactions to obtain the second interaction may be considered as optimization parameter.

The time metric may be a formula or rule or similar type of mathematical expression which comprises at least one parameter which is indicative of an action selected from the list of: selection actions of the user, switching between different segmentation tools, switching between different image slices, zooming action and panning action. The time metric may be represented by data stored in a memory accessible to the processor. Such a time metric may be heuristically designed, but also automatically generated, e.g., using machine learning as known per se. The time metric may be a further function of a type of user interactions in a respective candidate set, in that it may be a function of both the number and type of user interactions in a respective candidate set. In other words, with 'further function', it is meant that, in addition to being a function of the number of user interactions, it is also a function of this additional property or quantity. For example, the time metric may comprise one or more parameters which are indicative of this additional property or quantity.

It is noted that the time metric may be also a further a function of the geometrical complexity of the object. The processor 140 may be configured to calculates a geometrical complexity of the object. Methods for calculating a geometrical complexity of an object are known per se. For example, the ratio of outline to area for a 2D image or the ratio of surface to volume for a 3D image may be used to calculate a geometrical complexity of an object. In another example, statistics may be generated based on the derivative of the outline or surface to calculate a geometrical complexity of an object. In a further example, skeletonization methods may be used to calculate a skeleton for an object and based on the skeleton, the complexity of an object may be calculated.

It is noted that the segmentation data may further represent a position of a region of interest in the image, and the time metric is a further function of the position of the region of interest.

It is further noted that the processor 140 may be configured for indicating the optimized set of user interactions to the user by generating a video visually indicating the optimized set of user interactions.

It is noted that various operations of the system 100, including various optional aspects thereof, will be explained in more detail with reference to FIGS. 2a-9e.

It is noted that the system 100 may be embodied as, or in, a single device or apparatus, such as a workstation or imaging apparatus. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses. For example, the distribution may be in accordance with a client-server model.

Figure 2A:
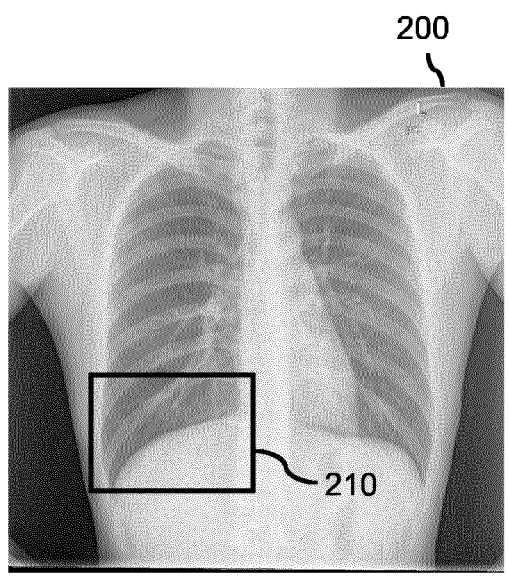
FIG. 2a shows an X-ray image of a chest and an indication of a zoomed-in view of an area for segmentation of a lung-field.
Figure 2B:
Figure 2C:
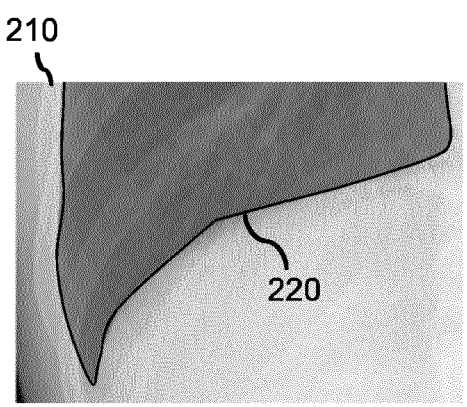
FIG. 2c shows a first segmentation of the lung-field of FIG. 2b.

FIG. 2a shows an X-ray image 200 of a chest and an indication of a zoomed-in view 210 of an area for segmentation of a lung-field. FIG. 2b shows the zoomed-in view 210 of FIG. 2a. FIG. 2c shows a first segmentation 220 of the lung-field of FIG. 2b. The user may obtain the first segmentation 220 using various manual or semi-manual segmentation techniques e.g. thresholding, clustering, region-growing or model-based segmentation. In an example, the user may perform a segmentation by manually selecting the lung-field using, e.g. a pencil tool (not shown).

It is noted that although this examples relate to chest radiography, it will be appreciated that this is a non-limiting example, and that the invention as claimed is equally applicable to other types of images and radiographs.

Figure 3:
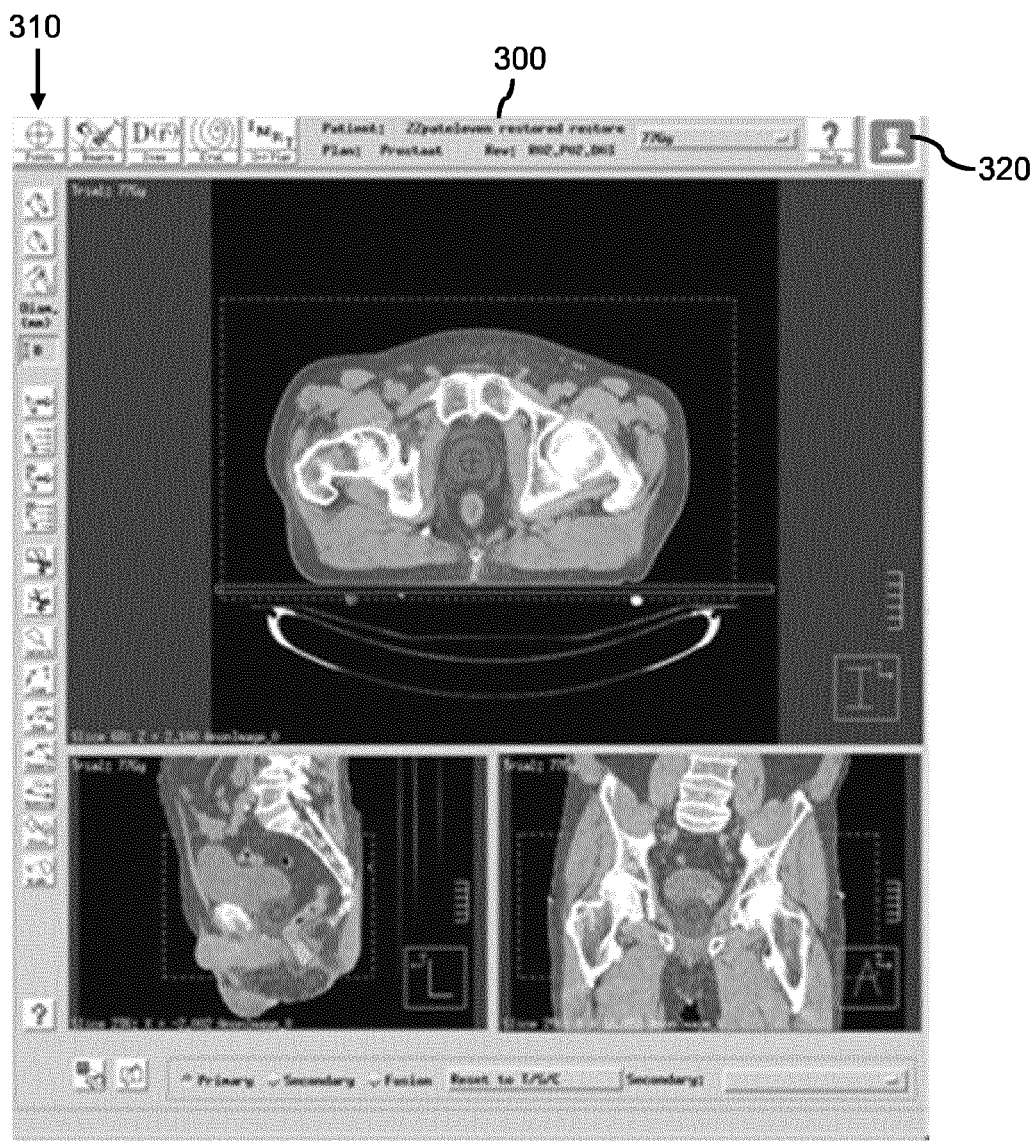
FIG. 3 shows an example of a graphical segmentation interface comprising a set of segmentation tools which may be used by a user to obtain a segmentation such as the first segmentation of FIG. 2c.
Figure 4A:
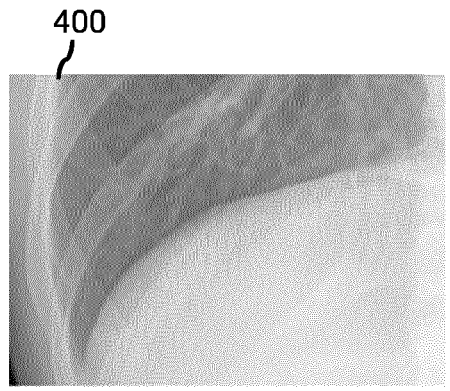
FIGS. 4a-f show intermediates results of a set of user interactions of a user with the graphical segmentation interface of FIG. 3 to obtain the first segmentation of FIG. 2c.
Figure 4B:
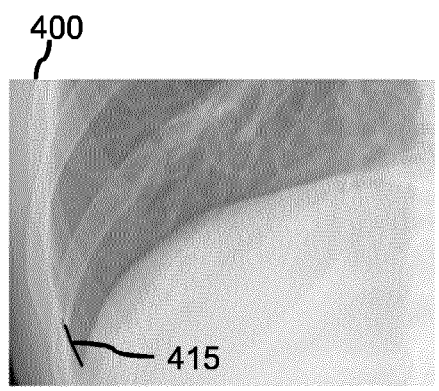
Figure 4C:
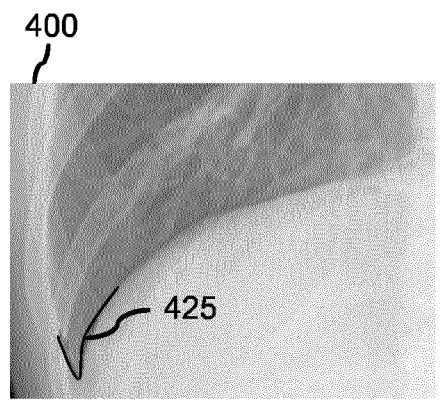
Figure 4D:
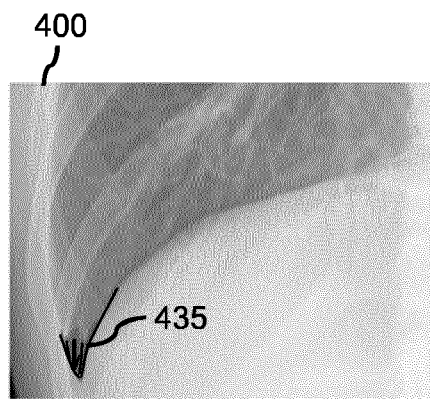
Figure 4E:
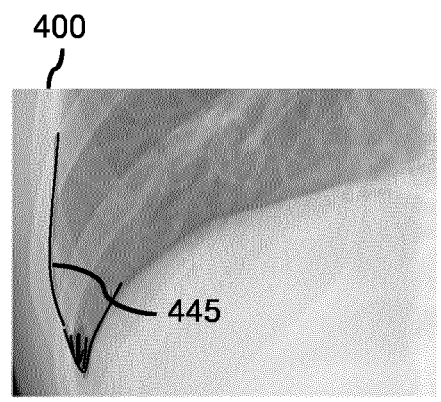
Figure 4F:
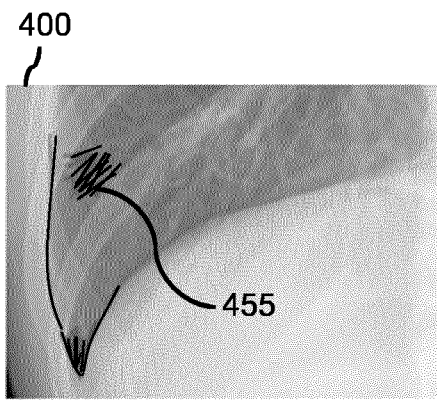
Figure 5A:
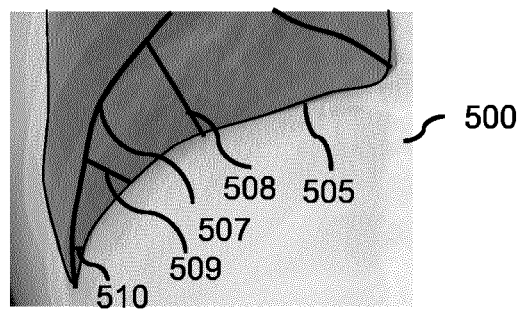
FIGS. 5a-d show results of an optimized set of user interactions for obtaining a second segmentation similar to the first segmentation of FIG. 2c.
Figure 5B:
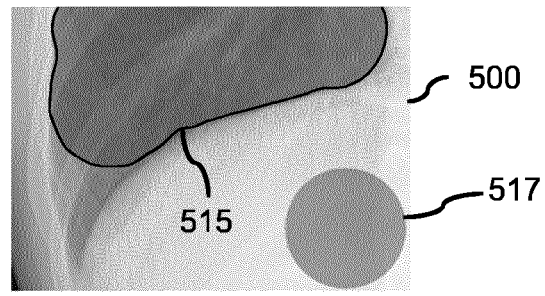
Figure 5C:
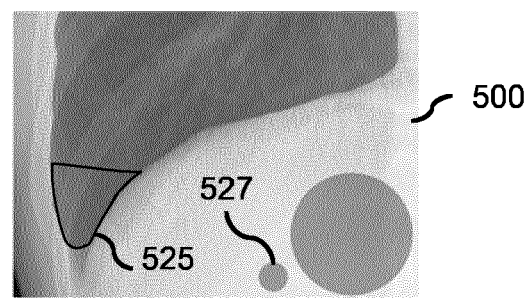
Figure 5D:
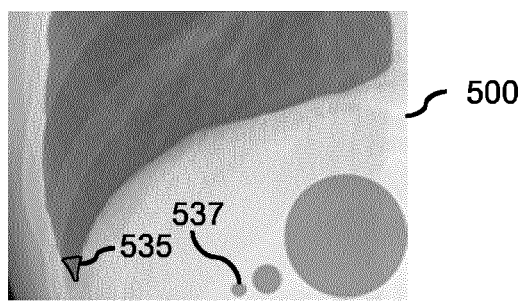
Figure 6A:
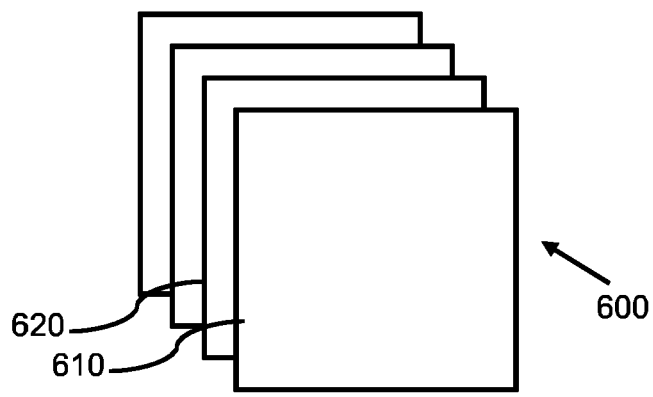
FIGS. 6a-e show schematic adaptive contour propagation of segmentation contours in a stack of image slices for obtaining a segmentation of an object.
Figure 6B:
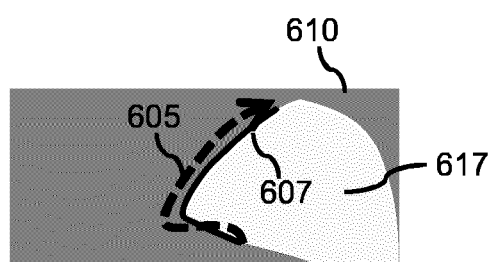
Figure 6C:
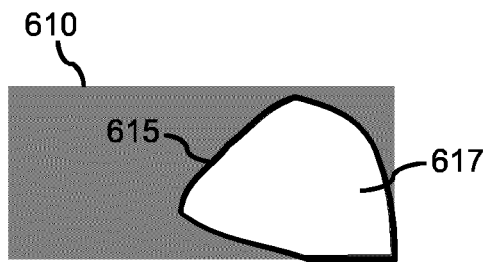
Figure 6D:
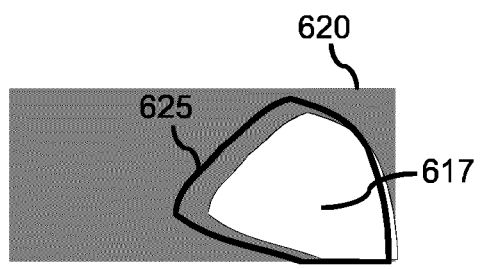
Figure 6E:
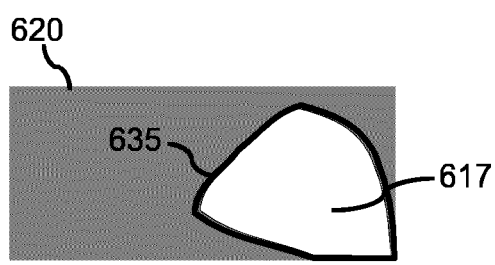

FIG. 3 shows an example of a graphical segmentation interface 300 comprising icons representing a set of segmentation tools 310 which may be used by a user to obtain a segmentation such as the first segmentation 220 of FIG. 2c. The graphical segmentation interface 300 may further comprise a training icon 320 for enabling a user to visually observe, e.g., in a video, an optimized set of user interactions which may be generated by the processor 140 of FIG. 1. For example, clicking on the training icon 320 may result in a video being shown to the user.

FIGS. 4a-f show intermediate results 400 of a set of user interactions of a user with the graphical segmentation interface 300 of FIG. 3 to obtain the first segmentation 220 of FIG. 2c. In this example, the user may have chosen a non-optimized parameter of a segmentation tool, namely a pencil tool with small stroke width for selecting a region of interest in the image. As such, the user may have to take several time consuming steps to gradually paint, i.e. select, different areas 415, 425, 435, 445, 455 of the image to obtain the first segmentation 220 of FIG. 2c. It is noted that the first segmentation of FIG. 2c is not shown in FIG. 4a-f and only some of the intermediate steps are presented.

FIGS. 5a-d show results 500 of an optimized set of user interactions for obtaining a second segmentation 505 similar to the first segmentation 220 of FIG. 2c. In this example, which is made simple for the sake of explanation, the user may have been unaware that a stroke width of a pencil tool 517 may be adjustable. The system 100 of FIG. 1 may optimize the stroke width of the pencil tool 517. In such optimization, the system 100 may, for example, take into account a geometrical complexity of the lung-field. The image 500 may be analyzed to determine, e.g., a skeleton 507 based on distances of the skeleton to an edge of the lung-field on the image 500. For determining such skeleton, object skeletonization methods may be used which are known in the art per se. When, e.g., an skeletonization methods is used, the distance, i.e. the shortest path, between each of the points at the edge of the lung-field to the skeleton is known. Based on variations in the distances, the image may be divided into a number of regions. For example, when the variation in the distances of adjacent points on an edge is less than a pre-determined threshold, the points on the edge may be considered as belonging to a same group to define a region. When the distance variation exceeds the threshold, another region may be defined in the image. In the non-limiting example of FIG. 5, three regions 515, 525, 535 are shown to be determined based on three distinct distances 508, 509, 510. The system 100 may change the stroke width of the pencil tool 517 at one or more of the determined regions 515, 525, 535 of the image so as to generate a plurality of candidate sets of user interactions which result in obtaining segmentations similar to the first segmentation 220 of FIG. 2. The system 100 may subsequently estimate a time needed for a user to carry out a respective one of the plurality of candidate sets of user interactions based on the number of user interactions, e.g., number of the selection of a different stroke width in a respective candidate set. The system 100 may then select one of the plurality of candidate sets of user interactions as the optimized set of user interactions based on said estimate of the time being lowest. In the example of FIGS. 5a-d, the optimized set of user interactions may comprise three different stroke width of the pencil 517, 527, 537 for partially segmenting the three different regions 515, 525, 535 in the image, respectively. For example, the stroke width of the pencil may be sequentially reduced based on the distance of the skeleton 507 from the edge of the lung-field. Namely, for the region 515 with larger distance 508 of the skeleton 507 from the edge of the lung-field, a larger stroke width 517 may be selected compared to the regions 525 and 535 with smaller distance 509, 510 of the skeleton 507 from the edge of the lung-field.

FIGS. 6a-e show schematic Adaptive Contour Propagation of segmentation contours 615, 625, 635 in a stack 600 of image slices for obtaining a segmentation of an object 617. It is noted that an Adaptive Contour Propagation method may be used to enable a semi-automatic segmentation for obtaining the first segmentation of a 3D object in an image comprising a stack of image slices. Adaptive Contour Propagation methods are known in the art per se. In an Adaptive Contour Propagation method, segmentation contours may be propagated to adjacent slices so as to obtain the segmentation of the object in the image slices. In the example of FIGS. 6a-e, the stack 600 of images may comprise at least two image slices 610, 620. An interactive scissors may be used for the segmentation. An adaptive contour drawing using e.g., a computer mouse, may stick to object edges 607 near a path 605 provided by the user. As such, the contour 607 may be derived based on the contour drawing 605 made by the user to form a complete contour 615. It is noted that the path may also be automatically generated by the system. For the segmentation of the image stack 600, the Adaptive Contour Propagation method may enable the propagation of contours 615, 625, 635 to neighboring slices. It is noted that in the Adaptive Contour Propagation method, a segmentation contour may be copied to a neighboring slice and some edge adaptive fitting may be automatically done which may allow the segmentation contour to be attracted to image contours based on an external energy function. An internal energy function may restrict a deformation to prevent attraction to possibly larger image gradients not belonging to the same object. The internal and external energy terms may steer an adaptability of the contour in adjacent slices. A total energy may be calculated as a sum of the external energy and a factor multiplied by the internal energy. The factor may be used to balance the two energy terms. The internal energy term may be designed in such a way that it penalizes derivations from an original contour. The external energy term may represent the similarity of the contour with the image or image features such as image edges. As such, the external energy term may attempt to maintain the original contour, while the internal energy term may attempt to get close to image edges. The energy terms may be balanced to prevent shapes dissimilar to the original contour.

Figure 7A:
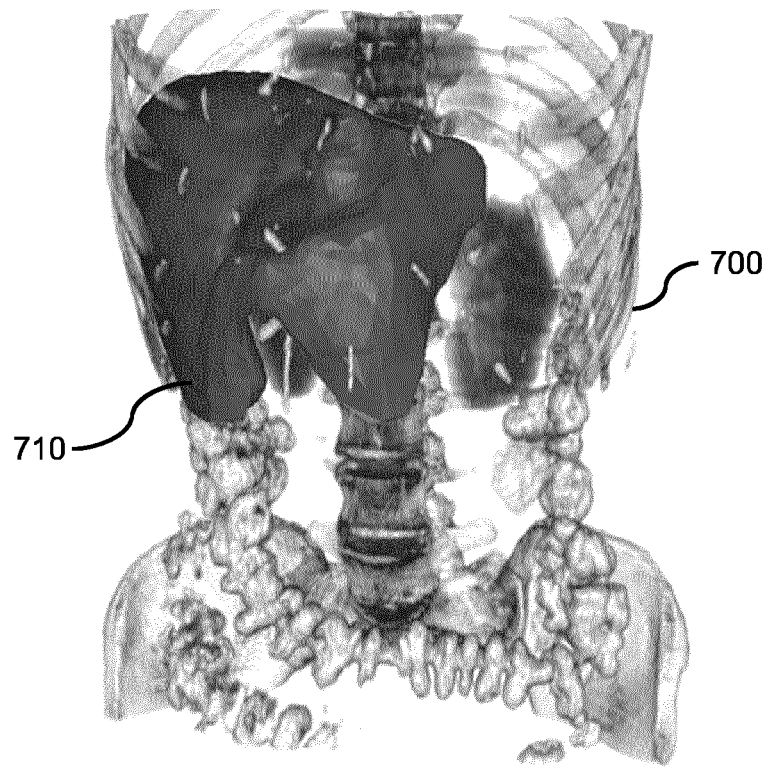
FIG. 7a shows a 3D image comprising a first 3D segmentation of a liver as obtained by the system.
Figure 7B:
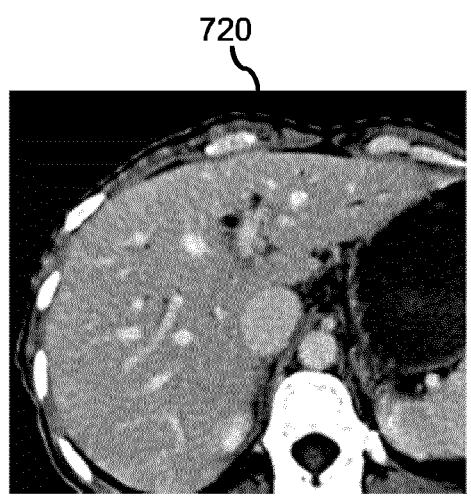
FIG. 7b shows an image slice in a transverse plane before the first segmentation of the liver is obtained.
Figure 7C:
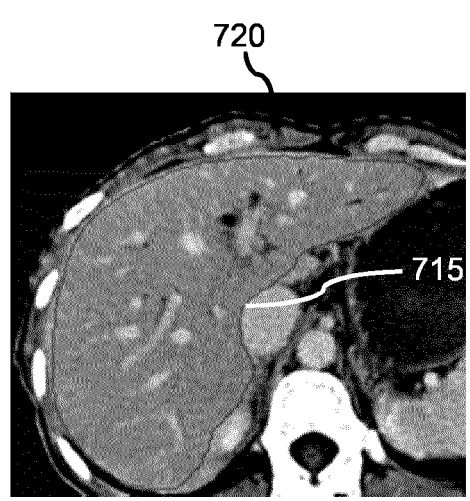
FIG. 7c shows the image slice in the transverse plane in which a segmentation section of the first segmentation of the liver is indicated.

FIG. 7a shows a 3D image 700 comprising a first 3D segmentation 710 of a liver as obtained by the processor. The first segmentation 710 may be obtained, for example, using an interactive scissors tool for a slice-wise segmentation. FIG. 7b shows an image slice 720 in a transverse plane before the first segmentation 710 of the liver is obtained. FIG. 7c shows the image slice 720 in the transverse plane in which a segmentation section 715 of the first segmentation 710 of the liver is indicated.

Figure 8A:
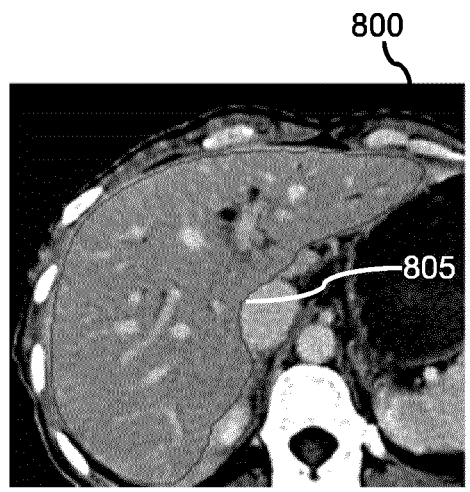
FIGS. 8a-c show three image slices showing three segmentation sections of the first segmentation of the liver in three parallel transverse planes.
Figure 8B:
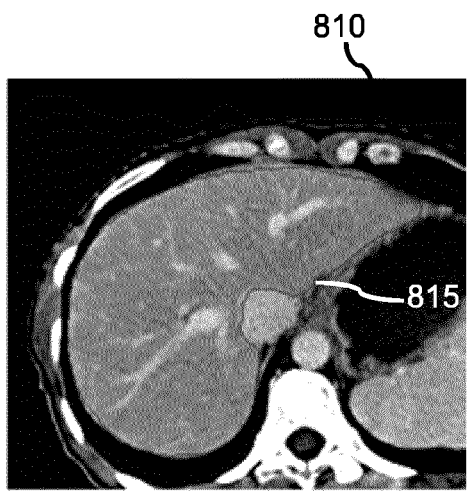
Figure 8C:
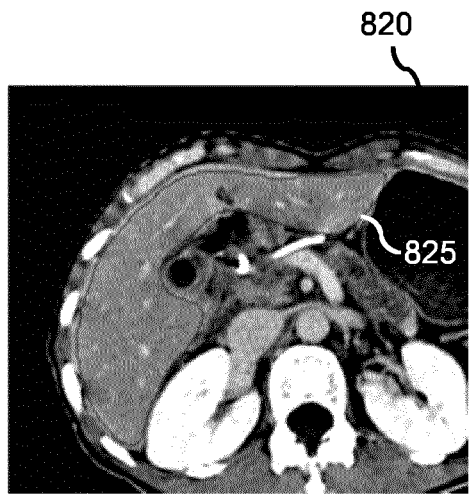

FIGS. 8a-c show three image slices 800, 810, 820 showing three segmentation sections 805, 815, 825 of the first segmentation 710 of the liver of FIG. 710 in three parallel transverse planes. It is noted that a user may view image slices using a navigation segmentation tool of the graphical segmentation interface 300 of FIG. 3 which may enable a user to navigate through the object in various planes and direction.

Figure 9A:
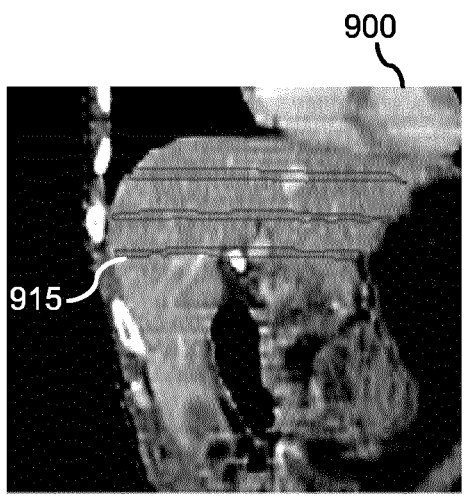
FIG. 9a shows initial counters in an image slice of the liver before applying Adaptive Contour Propagation to the image slice.
Figure 9B:
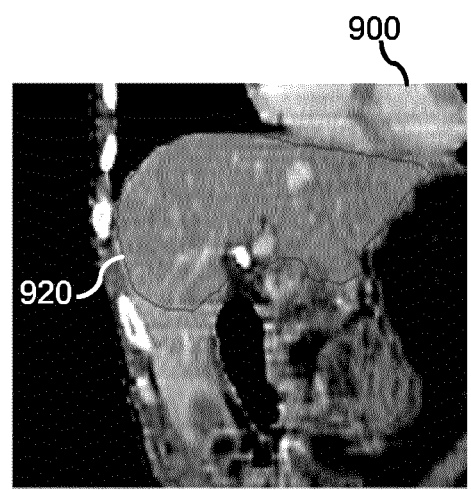
Figure 9C:
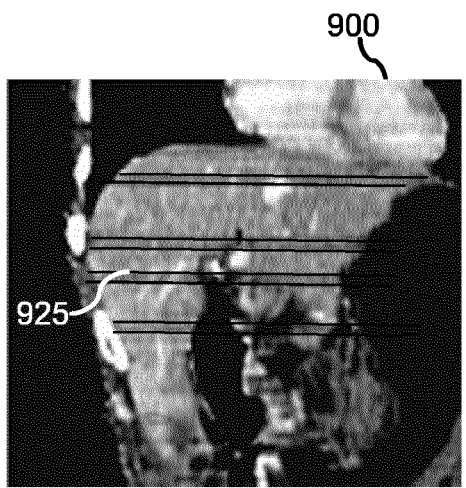
FIG. 9c shows another set of initial counters before applying Adaptive Contour Propagation to the image slice.
Figure 9D:
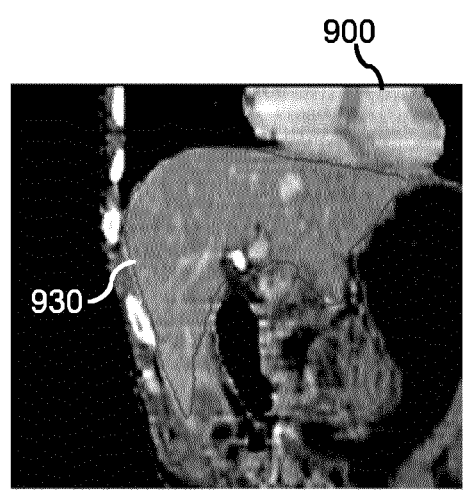
FIG. 9d shows a result of Adaptive Contour Propagation applied to the image slice of FIG. 9c.

FIG. 9a shows initial counters 915 in an image slice 900 of the liver before applying Adaptive Contour Propagation to the image slice 900. FIG. 9b shows a result of Adaptive Contour Propagation applied to the image slice 900 of FIG. 9a. The system and method as claimed may generate candidate sets by changing as set of initial counters 915. For example, FIG. 9c shows another set of initial counters 925 before applying Adaptive Contour Propagation to the image slice 900. FIG. 9d shows a result of Adaptive Contour Propagation applied to the image slice 900 of FIG. 9c. A difference between FIG. 9b and FIG. 9d may indicate, as such, the difference of the result of two different sets of initial contours in two different candidate sets. The system and method as claimed may, for example, determine an optimal set of initial contours based on which the desired segmentation may be obtained in less time.

Figure 10:
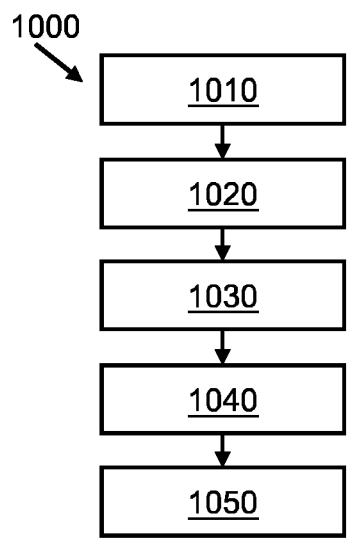
FIG. 10 shows a method for analyzing segmentation data for enabling indicating an optimized set of user interactions to a user.

FIG. 10 shows a computer-implemented method 1000 for segmenting an object in an image. It is noted that the method 1000 may, but does not need to, correspond to an operation of the system 100 as described with reference to FIG. 1. The method 1000 comprises, in an operation titled "ESTABLISHING GRAPHICAL SEGMENTATION INTERFACE", establishing a graphical segmentation interface on a display, the graphical segmentation interface comprising a set of segmentation tools for enabling the user to obtain a first segmentation of the object in the image, wherein the first segmentation is represented by segmentation data. The method 1000 comprises, in an operation titled "RECEIVING INTERACTION DATA", receiving 1010 interaction data from a user device operable by the user, the interaction data being indicative of a set of user interactions of the user with the graphical segmentation interface by which the first segmentation of the object was obtained. The method 1000 further comprises analyzing the segmentation data and the interaction data to determine an optimized set of user interactions which, when carried out by the user using the graphical segmentation interface, obtains a second segmentation which is similar to the first segmentation. This may comprise, in an operation titled "GENERATING CANDIDATE SETS", generating 1020 a plurality of candidate sets of user interactions which obtain segmentations similar to the first segmentation, in an operation titled "ESTIMATING TIME", estimating 1030 a time needed for a user to carry out a respective one of the plurality of candidate sets of user interactions using the graphical segmentation interface based on a time metric, the time metric being a function of at least the number of user interactions in a respective candidate set, in an operation titled "SELECTING CANDIDATE SET", selecting 1040 one of the plurality of candidate sets of user interactions as the optimized set of user interactions based on said estimate of the time being lowest, and in an operation titled "GENERATING OPTIMIZED INTERACTION DATA", generating 1050 optimized interaction data representing the optimized set of user interactions for enabling indicating the optimized set of user interactions to the user via the display.

It will be appreciated that the above operation may be performed in any suitable order, e.g., consecutively, simultaneously, or a combination thereof, subject to, where applicable, a particular order being necessitated, e.g., by input/output relations.

Figure 11:
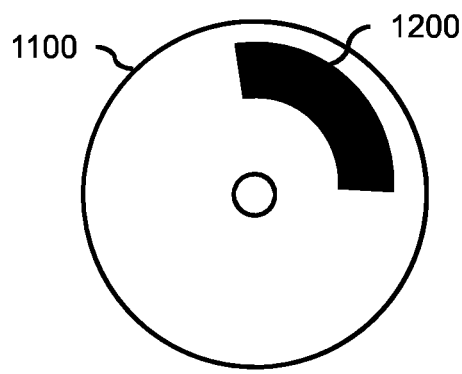
FIG. 11 shows schematic representation of a computer program product comprising instructions for causing a processor system to perform the method.

The method 1000 may be implemented on a computer as a computer implemented method, as dedicated hardware, or as a combination of both. As also illustrated in FIG. 11, instructions for the computer, e.g., executable code, may be stored on a computer readable medium 1100, e.g., in the form of a series 1200 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 11 shows an optical disc 1100.

It will be appreciated that, in accordance with the abstract of the present application, a system and a computer-implemented method are provided for segmenting an object in a medical image using a graphical segmentation interface. The graphical segmentation interface may comprise a set of segmentation tools for enabling a user to obtain a first segmentation of the object in the image. This first segmentation may be represented by segmentation data. Interaction data may be obtained which is indicative of a set of user interactions of the user with the graphical segmentation interface by which the first segmentation of the object was obtained. The system may comprise a processor configured for analyzing the segmentation data and the interaction data to determine an optimized set of user interactions which, when carried out by the user, obtains a second segmentation similar to the first segmentation, yet in a quicker and more convenient manner. A video may be generated for training the user by indicating the optimized set of user interactions to the user.

It is noted that according to the above, medical image processing still involves substantial amount of manual user interaction, e.g., for delineating organs at risk for a radio therapy treatment planning or for the correction of automated image masks generated with automatic segmentation algorithms. Often, a final result may be achieved using various segmentation tools with varying parameters. By recording the state of the image mask before and after the interaction, a faster or easier set of interactions including new, powerful interaction techniques that achieve the similar results may be calculated. The result may be presented to the user for training, e.g., by displaying an automatically generated, short training video. Furthermore, the method may be extended to include the underlying image features at positions, where interaction occurred. For example, it may be likely that the contour of a shape is moved from a homogeneous image region to an image edge. This information may be gathered from multiple interactive sessions on different images and may be used in conjunction with anatomical models or knowledge from other experts to predict useful interaction sequences on future images.

Examples, embodiments or optional features, whether indicated as non-limiting or not, are not to be understood as limiting the invention as claimed.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for segmenting an object in an image, comprising: a user interface subsystem comprising:
    a display output for establishing a graphical segmentation interface on a display, the graphical segmentation interface comprising a set of segmentation tools for enabling a user to obtain a first segmentation of the object in the image, wherein the first segmentation is represented by segmentation data;
    a user input interface configured to receive interaction data from a user device operable by the user, the interaction data being indicative of a set of user interactions of the user with the graphical segmentation interface by which the first segmentation of the object was obtained;
    a memory comprising instruction data representing a set of instructions; and
    a processor configured to communicate with the user input interface and the memory and to execute the set of instructions, wherein the set of instructions, when executed by the processor, cause the processor to:
        i) analyze the segmentation data and the interaction data to determine an optimized set of user interactions which, when carried out by the user using the graphical segmentation interface, obtains a second segmentation which is similar to the first segmentation, wherein the optimized set of user interactions is determined by:
        a) generate a plurality of candidate sets of user interactions which obtain segmentations similar to the first segmentation,
        b) estimate a time needed for a user to carry out a respective one of the plurality of candidate sets of user interactions using the graphical segmentation interface based on a time metric, the time metric being a function of at least the number of user interactions in a respective candidate set, and
        c) select one of the plurality of candidate sets of user interactions as the optimized set of user interactions based on said estimate of the time being lowest;
        ii) generate optimized interaction data-representing the optimized set of user interactions for enabling indicating the optimized set of user interactions to the user via the display.

2. The system according to claim 1, wherein the set of user interactions comprises a user interaction representing the user using a segmentation tool, and wherein the set of instructions, when executed by the processor, cause the processor to change a parameter of the segmentation tool so as to generate different candidate sets of user interactions.

3. The system according to claim 1, wherein the set of user interactions is comprised of a sequence of user interactions, and wherein the set of instructions, when executed by the processor, cause the processor to change the sequence of user interactions so as to generate different candidate sets of user interactions.

4. The system according to claim 1, wherein the graphical segmentation interface comprises at least one unused segmentation tool not used by the user to obtain the first segmentation, wherein the plurality of candidate sets of user interactions is generated using the at least one unused segmentation tool.

5. The system according to claim 1, wherein the time metric comprises at least one parameter which is indicative of an action selected from the list of: selection actions of the user, switching between different segmentation tools, switching between different image slices, zooming action and panning action.

6. The system according to claim 1, wherein the time metric is a function of a type of user interactions in a respective candidate set.

7. The system according to claim 1, wherein the set of instructions, when executed by the processor, cause the processor to calculate a geometrical complexity of the object and wherein the time metric is a function of the geometrical complexity of the object.

8. The system according to claim 1, wherein time metric is a function of an image feature of the image.

9. The system according to claim 1, wherein the set of instructions, when executed by the processor, cause the processor to indicate the optimized set of user interactions to the user by generating a video visually indicating the optimized set of user interactions.

10. A workstation comprising the system according to claim 1.

11. An imaging apparatus comprising the system according to claim 1.

12. A computer-implemented method for segmenting an object in an image, comprising:
    establishing a graphical segmentation interface on a display, the graphical segmentation interface comprising a set of segmentation tools for enabling a user to obtain a first segmentation of the object in the image, wherein the first segmentation is represented by segmentation data;
    receiving interaction data from a user device operable by the user, the interaction data being indicative of a set of user interactions of the user with the graphical segmentation interface by which the first segmentation of the object was obtained;
    analyzing the segmentation data and the interaction data to determine an optimized set of user interactions which, when carried out by the user using the graphical segmentation interface, obtains a second segmentation which is similar to the first segmentation, wherein the optimized set of user interactions is determined by:
    i) generating a plurality of candidate sets of user interactions which obtain segmentations similar to the first segmentation,
    ii) estimating a time needed for a user to carry out a respective one of the plurality of candidate sets of user interactions using the graphical segmentation interface based on a time metric, the time metric being a function of at least the number of user interactions in a respective candidate set, and iii) selecting one of the plurality of candidate sets of user interactions as the optimized set of user interactions based on said estimate of the time being lowest; and generating optimized interaction data representing the optimized set of user interactions for enabling indicating the optimized set of user interactions to the user via the display.

13. A non-transitory computer program product comprising instructions for causing a processor to perform the method according to claim 12.

* * * * *